(12) United States Patent
Kim

(10) Patent No.: US 10,150,870 B2
(45) Date of Patent: Dec. 11, 2018

(54) HIGH-GRADE MASTIC ASPHALT COMPOSITION AND PAVING CONSTRUCTION METHOD USING THE SAME

(71) Applicant: KOREA ROAD TECHNOLOGY CO., LTD, Namyangju-si (KR)

(72) Inventor: In Joong Kim, Namyangju-si (KR)

(73) Assignee: KOREA ROAD TECHNOLOGY CO., LTD., Namyangju (KR)

( * ) Notice: Subject to any disclaimer, the term of this patent is extended or adjusted under 35 U.S.C. 154(b) by 0 days.

(21) Appl. No.: 15/662,543

(22) Filed: Jul. 28, 2017

(65) Prior Publication Data

US 2018/0100066 A1 Apr. 12, 2018

(30) Foreign Application Priority Data

Oct. 7, 2016 (KR) .......................... 10-2016-0129475

(51) Int. Cl.
*C08L 95/00* (2006.01)
*C08L 9/06* (2006.01)
*C08F 212/08* (2006.01)
*C08F 236/08* (2006.01)

(52) U.S. Cl.
CPC ................ *C08L 95/00* (2013.01); *C08L 9/06* (2013.01); *C08F 212/08* (2013.01); *C08F 236/08* (2013.01); *Y02W 30/91* (2015.05); *Y02W 30/92* (2015.05)

(58) Field of Classification Search
CPC .......... C08L 95/00; C09D 195/00; C10C 3/00
See application file for complete search history.

(56) References Cited

FOREIGN PATENT DOCUMENTS

KR 10-1513765 B1 4/2015

*Primary Examiner* — Jennifer A Smith
*Assistant Examiner* — Alexandra M Moore
(74) *Attorney, Agent, or Firm* — Im IP Law; C. Andrew Im; Chai Im

(57) ABSTRACT

A high-grade mastic asphalt composition includes by weight: 100 parts of a natural asphalt mix; 5 to 40 parts of styrene isoprene styrene; 10 to 60 parts of at least one polymer resin; 10 to 1,000 parts of an aggregate; 1 to 20 parts of a thermosensitive reinforcing agent; 10 to 60 parts of a filler; 10 to 40 parts of a nanoceramic particle; 1 to 15 parts of a surfactant; 0.1 to 5 parts of an antioxidant; 0.5 to 5 parts of a stabilizer; 0.5 to 10 parts of a performance enhancer; 2 to 20 parts by weight of a fiber; 10 to 50 parts of a cohesive resin; 2 to 10 parts of an antisagging agent; and 1 to 5 parts of a compatibilizer. The consolute high-grade mastic asphalt composition has a high pavement performance and makes its conveyance and paving construction easier without using a cooker.

2 Claims, No Drawings

HIGH-GRADE MASTIC ASPHALT COMPOSITION AND PAVING CONSTRUCTION METHOD USING THE SAME

RELATED APPLICATIONS

This application claims priority from Korean Patent Application No. 10-2016-0129475 filed Oct. 7, 2016, which is incorporated herein by reference in its entirety.

BACKGROUND OF THE INVENTION

The present invention relates to a high-grade mastic asphalt composition, and more particularly to a high-grade mastic asphalt composition and a paving construction method using the same, where the mastic asphalt composition is of a consolute high-performance grade (PG 82-34) and enables its conveyance and paving construction with ease.

Asphalt is a refined residue from the distillation process of crude oils that involves the evaporation of volatile oil components in the crude oils. It is a chemically complicated composition consisting of hydrogen and carbon as principal components in combination with a small amount of nitrogen, sulfur and oxygen and widely used as a binder for aggregates in laying a pavement material on traffic surfaces.

As the asphalt is a thermosensitive material that undergoes a gel-to-liquid phase transition under heat and hardens at a relatively low temperature, either asphalt or aggregates or both of them are heated during the paving construction in order to promote the workability of the road pavement. As the asphalt cools over time during divided truck transports or a long-distance transport from the production facility to the paving site, or in the severe wintery weather, the asphalt concrete composition gets too hard to lay on the road and deteriorates in compactness or adhesion of aggregates with the binder materials, resulting in poor product quality of the completed pavement.

On the other hand, the mastic asphalt pavement is a double-layered composite pavement consisting of an underlying mastic asphalt having a thickness of 4 cm or less and an overlying modified asphalt having a thickness of 4 cm or greater. In this regard, the conventional mastic asphalt for the 4-cm underlying mastic asphalt adopts hard natural asphalt called "TLA (Trinidad Lake Asphalt) in combination with about 30% of general petroleum-derived asphalt. The TLA, imported all the way from foreign countries, is highly expensive and impossible to improve in terms of physical properties. Moreover, its high construction temperature of 230 to 250° C. causes deformation of the steel deck plate during the paving construction, and a lot of heat gets stuck in the pavement after the paving construction to make the pavement partly swollen, which may have an adverse effect to reduce the adhesion between the steel deck plate and the pavement and occasionally cause a break of the pavement immediately after the paving construction.

The mastic asphalt is an asphalt composition very excellent in fluidity and impervious to water due to its porosity of 1% or less, so it can be used in the concrete pavement or the waterproof pavement of the steel deck plate.

The conventional mastic asphalt, first named "Guss asphalt" and introduced to Korea, has been integrally developed into the recent mastic asphalt, which is popular in use to the waterproof layer for all the roads, including steel-deck bridges, concrete bridges, concrete pavement, side ditch, etc. to achieve recognition in its high performance.

The conventional mastic asphalt, however, necessarily requires the use of a device for mechanical agitation and conveyance, so-called "cooker" during the asphalt production and paving construction and normally takes a long time of about 1 to 2 hours for mechanical agitation and conveyance with high expense, causing inefficiency.

Furthermore, there are only a few domestic asphalt concrete companies capable of producing mastic asphalt in Korea, and many companies are mostly unable to manufacture mastic asphalt due to a lack of production facilities using high temperature of 200° C. or above (normally, 230 to 250° C.).

For this reason, the mastic asphalt is produced in a few domestic companies and transported long distances and thus faced with problems such as a rise of price, energy consumption, emission of pollutants, etc. in association with a long-distance conveyance.

According to the related prior art, KR Patent Publication No. 10-1513765 (registered on Apr. 14, 2015) under the title of "A mastic asphalt binder composition and its manufacturing method" discloses a mastic asphalt binder composition that comprises 100 pars by weight of a feed asphalt, 2 to 15 parts by weight of a polymer modifier, 4 to 15 parts by weight of a reinforcing agent, and 0 to 0.5 part by weight of a stabilizer.

According to the cited document, the mastic asphalt binder composition of the prior art exhibits excellences in rutting resistance, fatigue-cracking resistance, and constructability, and particularly in thermal stability under the temperature conditions of 230 to 250° C. and thus fits for use in the production of an impermeable asphalt mix that aims to provide waterproofing characteristics in the construction of steel-deck bridges, waterproof pavement, maintenance and repair of decrepit cement concrete, semi-rigid pavement, and so forth. But, the paving construction is performed using the mastic asphalt which is in the slurry state at high temperature of 230 to 250° C. as explained above in association with the problems with the mastic asphalt, so a lot of heat is stuck in the pavement after the paving construction to cause the swelling of the pavement and the deterioration of adhesion between the steel deck plate and the pavement, resulting in a break of the pavement immediately after the paving construction. Particularly, the mastic asphalt paving construction requires the use of a separate asphalt cooker for induction heating at high temperatures. The asphalt cooker of this type is used for special purposes only rather than general paving constructions, so it is unmarketable and requires separate equipment for mechanical agitation and conveyance, consuming a lot of time in agitation and conveyance with inefficiency.

Considering that the conventional asphalt cooker used for long-distance conveyance in the paving site is a very inefficient facility for asphalt production, the inventors of the present invention have suggested a novel composition for producing a mastic asphalt that enables the production of a mastic asphalt on site irrespective of the provision of the production facility by feeding the individual components in the paving site.

Furthermore, the current repair method for road and bridge pavement generally involves overlaying a modified asphalt of a second or third grade (PG64-22 or PG76-22).

But, the second-or-third grade asphalt pavement has a short life span and poor adhesiveness and flexibility and frequently shows segregation of ingredients and formation of portholes. Accordingly, there is a need for developing a high-grade mastic asphalt composition that has a high pavement performance (PG 82-34).

BRIEF SUMMARY OF THE INVENTION

For solving the above-described problems with the prior art, it is an object of the present invention to provide a consolute high-grade mastic asphalt composition and a paving construction method using the same, which asphalt composition has a high pavement performance (PG 82-34) and makes its conveyance and paving construction easier to enable an immediate and direct paving construction on site without a need of heating an asphalt mix at high temperatures and then conveying and paving the hot asphalt.

To achieve the objects of the present invention, the present invention is to provide a high-grade mastic asphalt composition that includes: 100 parts by weight of a natural asphalt mix; 5 to 40 parts by weight of styrene isoprene styrene; 10 to 60 parts by weight of at least one polymer resin selected from the group consisting of vinyl ester resin, polyester resin, acryl resin, epoxy resin, acryl-epoxy resin, and urethane resin; 10 to 1,000 parts by weight of an aggregate; 1 to 20 parts by weight of a thermosensitive reinforcing agent; 10 to 60 parts by weight of a filler; 10 to 40 parts by weight of a nanoceramic particle; 1 to 15 parts by weight of a surfactant; 0.1 to 5 parts by weight of an antioxidant; 0.5 to 5 parts by weight of a stabilizer; 0.5 to 10 parts by weight of a performance enhancer; 2 to 20 parts by weight of a fiber; 10 to 50 parts by weight of a cohesive resin; 2 to 10 parts by weight of an antisagging agent; and 1 to 5 parts by weight of a compatibilizer.

The present invention is also to provide a paving construction method using a high-grade mastic asphalt composition that includes: (a) removing foreign substances from a target surface for paving and then cleaning the surface; (b) depositing a high-grade mastic asphalt composition on the target surface after the completion of the cleaning step, wherein the high-grade mastic asphalt composition comprises 100 parts by weight of a natural asphalt mix, 5 to 40 parts by weight of styrene isoprene styrene, 10 to 60 parts by weight of at least one polymer resin selected from the group consisting of vinyl ester resin, polyester resin, acryl resin, epoxy resin, acryl-epoxy resin, and urethane resin, 10 to 1,000 parts by weight of an aggregate, 1 to 20 parts by weight of a thermosensitive reinforcing agent, 10 to 60 parts by weight of a filler, 10 to 40 parts by weight of a nanoceramic particle, 1 to 15 parts by weight of a surfactant, 0.1 to 5 parts by weight of an antioxidant, 0.5 to 5 parts by weight of a stabilizer, 0.5 to 10 parts by weight of a performance enhancer, 2 to 20 parts by weight of a fiber, 10 to 50 parts by weight of a cohesive resin, 2 to 10 parts by weight of an antisagging agent, and 1 to 5 parts by weight of a compatibilizer; and (c) curing the mastic asphalt composition after the completion of the depositing step (b).

Accordingly, the present invention provides a consolute high-grade mastic asphalt composition and a construction method using the same, where the asphalt composition has a high pavement performance of PG 82-34 and makes its conveyance and paving construction easier without the need of using a cooker to heat an asphalt mix at high temperatures and then conveying and paving the hot asphalt mix.

DETAILED DESCRIPTION OF THE INVENTION

Hereinafter, the present invention will be described in detail.

In one aspect of the present invention, there is provided a high-grade mastic asphalt composition that includes: 100 parts by weight of a natural asphalt mix; 5 to 40 parts by weight of styrene isoprene styrene; 10 to 60 parts by weight of at least one polymer resin selected from the group consisting of vinyl ester resin, polyester resin, acryl resin, epoxy resin, acryl-epoxy resin, and urethane resin; 10 to 1,000 parts by weight of an aggregate; 1 to 20 parts by weight of a thermosensitive reinforcing agent; 10 to 60 parts by weight of a filler; 10 to 40 parts by weight of a nanoceramic particle; 1 to 15 parts by weight of a surfactant; 0.1 to 5 parts by weight of an antioxidant; 0.5 to 5 parts by weight of a stabilizer; 0.5 to 10 parts by weight of a performance enhancer; 2 to 20 parts by weight of a fiber; 10 to 50 parts by weight of a cohesive resin; 2 to 10 parts by weight of an antisagging agent; and 1 to 5 parts by weight of a compatibilizer.

In another aspect of the present invention, there is provided a paving construction method using a high-grade mastic asphalt composition that includes: (a) removing foreign substances from a target surface for paving and then cleaning the surface; (b) depositing a high-grade mastic asphalt composition on the target surface after the completion of the cleaning step, wherein the high-grade mastic asphalt composition comprises 100 parts by weight of a natural asphalt mix, 5 to 40 parts by weight of styrene isoprene styrene, 10 to 60 parts by weight of at least one polymer resin selected from the group consisting of vinyl ester resin, polyester resin, acryl resin, epoxy resin, acryl-epoxy resin, and urethane resin, 10 to 1,000 parts by weight of an aggregate, 1 to 20 parts by weight of a thermosensitive reinforcing agent, 10 to 60 parts by weight of a filler, 10 to 40 parts by weight of a nanoceramic particle, 1 to 15 parts by weight of a surfactant, 0.1 to 5 parts by weight of an antioxidant, 0.5 to 5 parts by weight of a stabilizer, 0.5 to 10 parts by weight of a performance enhancer, 2 to 20 parts by weight of a fiber, 10 to 50 parts by weight of a cohesive resin, 2 to 10 parts by weight of an antisagging agent, and 1 to 5 parts by weight of a compatibilizer; and (c) curing the mastic asphalt composition after the completion of the depositing step (b).

The natural asphalt mix according to the present invention is not specifically limited, under the condition that it is an asphalt mix containing natural asphalt generally used in the related art. As recommended, the natural asphalt mix as used herein may be a mixture of natural asphalt, petroleum-derived asphalt, etc.

The natural asphalt contained in the natural asphalt mix of the present invention may include Trinidad lake asphalt and/or Trinidad epure asphalt.

Here, the natural asphalt functions not only to improve the fluidity of the asphalt composition of the present invention and but also to increase deformation resistance, skid resistance, friction resistance, or the like.

The natural asphalt is contained in the natural asphalt mix in an amount of 0.5 to 10 wt. %, preferably 2 to 5 wt. %. When the content of the natural asphalt is less than 0.5 wt. %, the natural asphalt has only a marginal effect in improving the fluidity, deformation resistance, and friction resistance. When the content of the natural asphalt exceeds 10 wt. %, the natural asphalt composition of the present invention may become soft and have the lower softening temperature.

The natural asphalt constituting the natural asphalt mix is not specifically limited under the condition that it is a natural asphalt mix generally used in the related art. Yet, the recommended natural asphalt is at least one selected from the group consisting of Trinidad lake asphalt and Trinidad epure asphalt; preferably, a mixture of straight asphalt having a penetration index of 20 to 40 and natural asphalt (e.g., Trinidad lake asphalt and/or Trinidad epure asphalt);

more preferably, a mixture containing 90 to 99.5 wt. % of straight asphalt having a penetration index of 20 to 40 and 0.5 to 10 wt. % of natural asphalt consisting of Trinidad lake asphalt or Trinidad epure asphalt.

The straight asphalt as used herein is a kind of petroleum-derived asphalt that is a refined residue from dry distillation or steam distillation) of crude oils. Particularly, the straight asphalt having a penetration index of 20 to 40 is preferred due to easiness of paving construction on the roads.

The straight asphalt is preferably contained in the natural asphalt mix in an amount of 90 to 99.5 wt. %. When the content of the straight asphalt is less than 90 wt. %, it takes a lot of time to cure the asphalt mix after the paving construction and has the lower softening temperature. When the content of the straight asphalt is greater than 99.5 wt. %, the fluidity of the asphalt mix may become lower.

The contents of the other components than the natural asphalt mix in the high-grade mastic asphalt composition of the present invention are given with respect to 100 parts by weight of the natural asphalt mix.

The styrene isoprene styrene (SIS) according to the present invention suppresses the occurrence of cracks in the asphalt composition, provides the waterproofing function, and enhances the strength.

Particularly, the use of the styrene isoprene styrene makes it easier to perform conveyance and paving construction of the mastic asphalt composition of the present invention without an asphalt cooker or the like.

The desirable content of the styrene isoprene styrene as used herein is flexible according to the user's choice, but preferably in the range of 5 to 40 parts by weight with respect to 100 parts by weight of the natural asphalt mix.

The at least one polymer resin selected from the group consisting of vinyl ester resin, polyester resin, acryl resin, epoxy resin, acryl-epoxy resin, and urethane resin according to the present invention is to provide a waterproofing function and adhesiveness for the mastic asphalt composition, enhance the strength, and suppress the occurrence of cracks. The content of the at least one polymer resin is preferably 10 to 60 parts by weight with respect of 100 parts by weight of the natural asphalt mix.

The aggregate according to the present invention includes constructional mineral materials that are chemically inert and used with a binder such as asphalt, polymer resin, etc. to form a compound material.

The aggregate refers to sand, gravel, basalt, crushed stone, or the like.

Specifically, the aggregate may further include basic dike rock having a particle diameter of about 25 mm and an absorption factor of about 0.7% and/or bauxite having a particle diameter of about 5 mm and an absorption factor of about 5.40%.

According to the aggregate size, the aggregate having a diameter of 0.074 mm or above and less than 4.76 mm is referred to as "fine aggregate"; and the aggregate having a diameter of 4.76 mm or greater is referred to as "coarse aggregate". The content of the aggregate is preferably 10 to 1,000 parts by weight with respect to 100 parts by weight of the natural asphalt mix. The mixing ratio of the fine and coarse aggregates in the aggregate is not specifically limited and may be varied adequately.

The thermosensitive reinforcing agent of the present invention improves the thermosensitivity of the mastic asphalt composition to reduce the variation of performance of the mastic asphalt composition by the changes of the weather. Any kind of thermosensitive reinforcing agent generally used for the specified purpose in the related art is available in the present invention. Preferably, the thermosensitive reinforcing agent as used herein may include byproducts from hydro-modification or hydro-cracking of vacuum gas oil, hydro-isomerization of slack wax, or synthesis of methane gas, polyethylene or polypropylene, where the byproducts selected as the thermosensitive reinforcing agent desirably include at least one saturated hydrocarbon-based compound having a flash temperature of 180° C. or higher and a saturated hydrocarbon content of 80% or greater.

As the saturated hydrocarbon functions to increase the thermosensitivity, the higher content of the saturated hydrocarbon results in the less variation of performance of the mastic asphalt mix by the changes of the weather. With a relatively low content of the saturated hydrocarbon, the aromatic content relatively increases to reduce the thermosensitivity. To make the equivalent effectiveness, the more amount of the saturated hydrocarbon is required, which leads to a rise of the production cost with economic inefficiency.

It is therefore desirable to select a saturated hydrocarbon byproduct having a saturated hydrocarbon content of 80% or greater among the byproducts. Preferably, at least one saturated hydrocarbon-based byproduct having a flash temperature of 230° C. and a saturated hydrocarbon content of 90% or greater is selected from the group of byproducts from the hydro-cracking process of vacuum gas oil and the synthesis process of methane gas.

The desirable content of the thermosensitive reinforcing agent is not specifically limited and may be preferably in the range of 1 to 20 parts by weight with respect to 100 parts by weight of the natural asphalt mix.

The filler according to the present invention is used to fill the pores of the asphalt composition and enhance the stability, wear resistance and flow resistance of the asphalt composition and the inter-binding strength of the asphalt composition, eventually increasing the Marshall stability.

Preferably, the filler as used herein may include at least one selected from the group consisting of lime powder, portland cement, slacked lime, fly ash, collected dust, electric arc furnace steel-making dust, casting dust, or incineration ash. The recommended content of the filler is 10 to 60 parts by weight with respect to 100 parts by weight of the natural asphalt mix.

The nanoceramic particle according to the present invention floats on the surface of the asphalt composition during the curing process of the asphalt composition, specifically the high-grade mastic asphalt composition, to form a dense surface with high hardness, which prevents penetration of water vapor and other gases and liquids into the asphalt composition and also enhances the excess-moisture tolerance, durability, weather resistance, impact resistance, and chemical resistance.

The content of the nanoceramic particle as used herein is preferably 10 to 40 parts by weight with respect to 100 parts by weight of the natural asphalt mix.

The preferred examples of the nanoceramic particle include silicon carbide, alumina, silica, zirconia-silica, ZnO, $TiO_2$, and/or $CaCO_3$.

The average particle diameter of these ceramic particles is desirably on the order of nanometers. More specifically, the preferred average particle diameter of the nanoceramic particles is 300 to 500 nm for the silicon carbide, 50 to 1,000 nm for the alumina, 700 to 1,500 nm for the silica, 500 to 1,000 nm for the zirconia-silica, 500 to 1,000 nm for the ZnO, 100 to 300 nm for the $TiO_2$, and 500 to 1,000 nm for the $CaCO_3$.

Among these nanoceramic particles, the silicon carbide, which is not found as a natural mineral substance but artificially synthesized, displays excellences in chemical stability and corrosion resistance and high hardness.

The surfactant according to the present invention is an anionic surfactant, such as sulfone ester, sulfonic acid, phosphoric ester, etc.; a cationic surfactant, such as secondary amine salt, tertiary amine salt, etc.; or an amphoteric surfactant, such as amino acids, etc.

The content of the surfactant as used herein is preferably 1 to 15 parts by weight with respect to 100 parts by weight of the natural asphalt mix.

The antioxidant according to the present invention is to prevent the oxidation of the high-grade mastic asphalt composition.

The preferred antioxidant may include amine-, bisphenol-, monophenol-, or sulfur-based antioxidants. The content of the antioxidant as used herein is preferably 0.1 to 5 parts by weight with respect to 100 parts by weight of the natural asphalt mix.

Specifically, the recommended antioxidant of the present invention for the process at high temperature may include low-molecular and/or high-molecular polymer type phenol-based antioxidants, such as, for example, 2,2-methylene bis(4-methyl-6-t-butylphenol), 2,6-di-t-butyl-4-methylphenol, or a mixture thereof.

The stabilizer according to the present invention is to provide stability by protecting the high-grade mastic asphalt composition against UV radiations. Any type of stabilizer is acceptable, under the condition that it is generally used for this defined purpose in the related art. Yet, the stabilizer preferably includes acryl polyol resin, non-yellowing polyurea resin, polyisocyanate, and/or a mixture thereof. The content of the stabilizer is preferably 0.5 to 10 parts by weight with respect to 100 parts by weight of the natural asphalt mix.

The performance enhancer according to the present invention is to enhance the functions of the natural asphalt mix constituting the asphalt composition. Any type of performance enhancer, specifically asphalt performance enhancer is acceptable, under the condition that it is generally used for this defined purpose in the related art. The content of the performance enhancer is preferably 0.5 to 10 parts by weight with respect to 100 parts by weight of the natural asphalt mix.

The preferred performance enhancer may include 90 to 99.5 wt. % of vinylacetate monomer-paraffin oil and 0.5 to 10 wt. % of benzoyl peroxide with respect to the total weight of the performance enhancer.

In this regard, the vinylacetate monomer-paraffin oil is preferably a mixture comprising 5 to 25 wt. % of a vinylacetate monomer and 75 to 95 wt. % of paraffin oil.

The fiber according to the present invention is to provide lightweightness and/or tensile strength against the stress applied in the vertical-horizontal directions of the bridge surface made of the high-grade mastic asphalt composition. Any type of fiber is acceptable, under the condition that it is generally used for this defined purpose in the related art. Preferably, the fiber as used herein may include at least one selected from asbestos, rock wool, polypropylene, polyester, glass fiber, natural cellulose fiber, and mineral fiber. The content of the fiber is preferably 2 to 20 parts by weight with respect to 100 parts by weight of the natural asphalt mix.

The cohesive resin according to the present invention is to enhance the cohesiveness of the high-grade mastic asphalt composition. Any type of resin is acceptable, under the condition that it is generally used for this defined purpose in the related art. Preferably, the cohesive resin as used herein may include synthetic petroleum resins, such as aromatic-hydrocarbon-based petroleum resin, aliphatic-hydrocarbon-based petroleum resin, dicyclopentadiene-based resin, polybutene, coumarone-indene resin, etc.; natural petroleum resins, such as polyterpene resin, terpene phenol resin, rosin, rosin ester, etc.; or hydrogenated products thereof. More preferably, the cohesive resin is an aromatic-hydrocarbon-based petroleum resin having a flash temperature of 70 to 170° C.

If not specifically limited, the content of the cohesive resin is preferably 10 to 50 parts by weight with respect to 100 parts by weight of the natural asphalt mix.

When the content of the cohesive resin is less than 10 parts by weight, the adhesion with the aggregates deteriorates. When the content of the cohesive resin exceeds 50 parts by weight, the product sticks together in the process to make the process difficult and result in an additional rise of the processing cost for the solution to this problem.

The antisagging agent according to the present invention is used to avoid excessive fluidity during the paving construction using the high-grade mastic asphalt composition. Any type of antisagging agent is acceptable, under the condition that it is generally used for this defined purpose in the related art. Preferably, the antisagging agent as used herein may include at least one selected from polyethylene (PE) wax, polypropylene (PP) wax, amide wax, zinc stearate, calcium stearate, stearic acid, or micro-wax. The content of the antisagging agent is preferably 2 to 10 parts by weight with respect to 100 parts by weight of the natural asphalt mix.

The compatibilizer according to the present invention is to increase the compatibility between the natural asphalt mix and the performance enhancer contained in the asphalt composition.

The preferred compatibilizer may include polyphosphate, metallic salt mineral acids, or a mixture thereof. The content of the compatibilizer is preferably 1 to 5 parts by weight with respect to 100 parts by weight of the natural asphalt mix.

In a specific aspect, the high-grade mastic asphalt composition according to the present invention may further include 5 to 30 parts by weight of a glycidyl methacrylate (GMA) resin with respect to 100 parts by weight of the natural asphalt mix in order to enhance the impact strength, elongation, tensile strength, and/or elasticity.

Preferably, the glycidyl methacrylate (GMA) resin as used herein may include at least one selected from ethylene-glycidyl methacrylate copolymer (EGMA) or ethylene-butyl acrylate-glycidyl methacrylate copolymer (EBA-GMA).

In another specific aspect, the high-grade mastic asphalt composition according to the present invention may further include 2 to 30 parts by weight of a hardening agent with respect to 100 parts by weight of the natural asphalt mix in order to harden the asphalt composition.

Preferably, the hardening agent as used herein may include 4,4-diphenylmethane diisocyanate (MDI), hexamethylenetetramine, amine, polyamide, and/or a mixture thereof.

Specifically, the hardening agent may further include a low profile agent.

In this case, the low profile agent is preferably used in an amount of no more than 30 wt. % with respect to the total weight of the hardening agent.

The preferred low profile agent as used herein includes an unsaturated polyester-based low profile agent, such as, for example, a low profile agent comprised of an unsaturated polyester resin.

In still another aspect, the high-grade mastic asphalt composition according to the present invention may further include 5 to 30 parts by weight of an adhesion promoter with respect to 100 parts by weight of the natural asphalt mix in order to make the adhesion with the targeted contact surface easier.

Preferably, the adhesion promoter as used herein may include hydroxyl ethyl acryloyl phosphate, hydroxyl ethyl methacrylate phosphate, or a mixture thereof.

In further another aspect, the asphalt composition of the present invention, specifically the high-grade mastic asphalt composition may further include 20 to 50 parts by weight of a crosslinked polyacrylate salt with respect to 100 parts by weight of the natural asphalt mix so that the crosslinked polyacrylate salt absorbs water to expand in volume and fill up the asphalt pores, preventing penetration of water into the asphalt composition and thus enhancing the durability of the asphalt composition.

Here, the crosslinked polyacrylate salt refers to a crosslinked polymer of acrylate salt that is a sort of super absorbent polymer comprising a copolymer of an acrylic acid including an acrylic acid dl as a crosslinking agent and sodium acrylate and having a molecular formula of $(C_3H_4O_2.C_3H_3O_2Na)_x$.

The crosslinked polyacrylate salt having the above-defined structure is a polymer capable of absorbing liquids due to the hydrophilic groups introduced from the three-dimensional network structure formed through the crosslinkage among the polymer chains or a single-chain structure. As the crosslinked polyacrylate salt is far superior in absorbency to general polymer materials and thus available as a high-performance material necessary to make personal hygiene products with slimmer with high performance. The crosslinked polyacrylate salt used as a super absorbent polymer in the asphalt composition expands when in contact with water and fills up the inner pores of the asphalt composition to prevent the penetration of water into the asphalt composition and thus increase the durability of the asphalt composition.

In further another aspect, the asphalt composition of the present invention may further include 5 to 30 parts by weight of an antistripping agent with respect to 100 parts by weight of the natural asphalt mix in order to prevent the asphalt composition from being easily stripped from the target surface to be paved.

Preferably, the antistripping agent includes polyphosphate-, amine-, or phosphate ester-based antistripping agents.

Specifically, the antistripping agent may be a liquid type polyphosphate-based antistripping agent having a specific gravity of 1.0 or greater and a viscosity (at 60° C.) of 110 cPs; or a liquid type amine-based antistripping agent having an acid value of 10 mg KOH/g or less and the total amine value of 140 to 400 mg HCl/g.

In further another aspect, the asphalt composition of the present invention may further include 2 to 5 parts by weight of a wax with respect to 100 parts by weight of the natural asphalt mix in order to prevent the tackiness on the surface of the dry layer and avoid contamination on the surface due to vehicle traffic.

Preferably, the wax as used herein may include polyethylene wax, polypropylene wax, or a mixture thereof.

In further another aspect, the high-grade mastic asphalt composition of the present invention may further include a waste asphalt.

The waste asphalt occurs after replacement of worn-out paving asphalt. The content of the waste asphalt is preferably 50 to 150 parts by weight with respect to 100 parts by weight of the natural asphalt mix.

In further another aspect, the asphalt composition of the present invention may further include a polymer modifier.

Any kind of polymer modifier is available, under the condition that it is generally used in the related art. The content of the polymer modifier is preferably 2 to 40 parts by weight with respect to 100 parts by weight of the natural asphalt mix.

In one aspect of the polymer modifier, the present invention preferably uses a modifier including a polymer resin selected from the group consisting of crude rubber, nitrile rubber, styrene butadiene rubber, butadiene rubber, and a mixture thereof.

In another specific aspect, the high-grade mastic asphalt composition of the present invention may further include 5 to 20 parts by weight of a bioresin with respect to 100 parts by weight of the natural asphalt mix in order to suppress the occurrence of cracks and enhance the adhesiveness and durability.

Preferably, the bioresin as used herein may include oil-modified alkyd resin, oil-modified urethane resin or aliphatic ester of oil-modified urethane resin, modified epoxy resin, aliphatic ester of oil-modified epoxy resin, bio-polyethylene resin, L-polylactic acid, or a mixture thereof. More preferably, the bioresin is oil-modified alkyd resin.

The term "oil-modified resin" as used herein refers to a resin containing an oil component in the molecule. The use of the oil-modified resin makes it easier to control the dispersability, mechanical properties, hardening properties, and film formability.

Specifically, the bioresin may be a vegetable oil that is an oil extracted from plants or plant seeds, including, for example, rice oil, palm oil, coconut oil, castor oil, grapeseed oil, jojoba oil, safflower oil, macadamia nuts oil, olive seed oil, or a mixture thereof.

In this regard, the mixing weight ratio of the bioresin to the vegetable oil is variable depending on the user's chose and preferably in the range of 1:9 to 9:1.

In further another specific aspect, the high-grade mastic asphalt composition of the present invention may further include 0.1 to 1 part by weight of sodium benzoate with respect to 100 parts by weight of the natural asphalt mix in order to enhance the viscoelasticity of the asphalt composition. The content of the sodium benzoate less than 0.1 part by weight results in making a marginal effect, whereas the content of the sodium benzoate greater than 1 part by weight provides an excess of the sodium benzoate to deteriorate the properties.

In further another specific aspect, the mastic asphalt composition of the present invention may further include 0.1 to 2 parts by weight of dimer acid with respect to 100 parts by weight of the natural asphalt mix in order to prevent the deposited asphalt composition from stripping.

If not specifically limited in terms of its origin or form, the dimer acid is preferably a dimer of a vegetable oil fatty acid, where the vegetable oil fatty acid may be at least one selected from the group consisting of oleic acid, linoleic acid, stearic acid, and palmitic acid.

In further another specific aspect, the high-grade mastic asphalt composition according to the present invention may further include 1 to 10 parts by weight of tetraethylene pentamine (TEPA) with respect to 100 parts by weight of the natural asphalt mix in order to control the viscosity and increase the strength. The content of the tetraethylene pentamine less than 1 part by weight makes a marginal effect, whereas the content of the tetraethylene pentamine greater than 10 parts by weight provides an excess of the tetraethylene pentamine to make an adverse effect on the properties of the mastic asphalt composition.

In further another specific aspect, the high-grade mastic asphalt composition according to the present invention may further include 0.1 to 5 parts by weight of bentonite with respect to 100 parts by weight of the natural asphalt mix in order to improve the watertightness and the permeability coefficient. The content of the bentonite less than 0.1 part by weight makes a marginal effect, whereas the content of the bentonite exceeding 5 parts by weight provides an excess of the bentonite to deteriorate the properties of the mastic asphalt composition.

In further another specific aspect, the high-grade mastic asphalt composition according to the present invention may further include 1 to 5 parts by weight of calcium aluminate with respect to 100 parts by weight of the natural asphalt mix in order to prevent the dry shrinkage of the composition. The calcium aluminate contained in the composition expands to prevent the dry shrinkage of the composition. The content of the calcium aluminate less than 1 part by weight makes a marginal effect, whereas the content of the calcium aluminate greater than 5 parts by weight provides an excess of the calcium aluminate to deteriorate the workability.

In further another specific aspect, the high-grade mastic asphalt composition according to the present invention may further include 1 to 5 parts by weight of fluorinated sodium with respect to 100 parts by weight of the natural asphalt mix in order to improve the filling properties and durability of the composition. The fluorinated sodium not only functions as an asphalt filler but also enhances the durability of the composition. Such effects are made when its content is given in the above-defined range.

In further another specific aspect, the high-grade mastic asphalt composition according to the present invention may further include 1 to 5 parts by weight of a styrene-butadiene resin with respect to 100 parts by weight of the natural asphalt mix in so that the styrene-butadiene resin forms a polymer film in the composition not only to increase the bending strength, tensile strength and adhesion strength of the composition, but also to improve the durability of the composition using the polymer film. The content of the styrene-butadiene resin less than 1 part by weight makes a marginal effect of the styrene-butadiene resin, whereas the content of the styrene-butadiene resin greater than 5 parts by weight provides an excess of the styrene-butadiene resin to deteriorate the economic efficiency.

A paving construction method using the above-defined high-grade mastic asphalt composition of the present invention can be explained as follows.

Preferably, the paving construction method using the high-grade mastic asphalt composition is not specifically limited and may include: (a) removing foreign substances from a target surface for paving and then cleaning the surface; (b) depositing a high-grade mastic asphalt composition on the target surface after the completion of the cleaning step, wherein the high-grade mastic asphalt composition comprises 100 parts by weight of a natural asphalt mix, 5 to 40 parts by weight of styrene isoprene styrene, 10 to 60 parts by weight of at least one polymer resin selected from the group consisting of vinyl ester resin, polyester resin, acryl resin, epoxy resin, acryl-epoxy resin, and urethane resin, 10 to 1,000 parts by weight of an aggregate, 1 to 20 parts by weight of a thermosensitive reinforcing agent, 10 to 60 parts by weight of a filler, 10 to 40 parts by weight of a nanoceramic particle, 1 to 15 parts by weight of a surfactant, 0.1 to 5 parts by weight of an antioxidant, 0.5 to 5 parts by weight of a stabilizer, 0.5 to 10 parts by weight of a performance enhancer, 2 to 20 parts by weight of a fiber, 10 to 50 parts by weight of a cohesive resin, 2 to 10 parts by weight of an antisagging agent, and 1 to 5 parts by weight of a compatibilizer; and (c) curing the mastic asphalt composition after the completion of the depositing step (b).

Hereinafter, the present invention will be described in further detail with reference to the following examples, which are given only to illustrate the present invention and not construed to limit the scope of the present invention.

Example 1

A high-grade mastic asphalt composition was prepared by mixing 100 g of an asphalt mix comprising a mixture of 97 g of straight asphalt having a penetration index of 30 and 3 g of natural asphalt consisting of Trinidad lake asphalt; 15 g of styrene isoprene styrene; 30 g of acryl resin; 300 g of coarse aggregates; 10 g of a thermosensitive reinforcing agent having a flash temperature of about 180° C. or above and including a saturated hydrocarbon having a hydrocarbon content of 80% or greater among the byproducts from the hydro-modification process of vacuum gas oil; 40 g of portland cement; 20 g of silicon carbide having an average particle diameter of 400 nm; 8 g of phosphoric ester; 2 g of 2,6-di-t-butyl-4-methylphenol; 3 g of a non-yellowing polyurea resin; 5 g of a performance enhancer comprising a mixture of 4.75 g of vinylacetate monomer-paraffin oil and 0.25 g of benzoyl peroxide; 10 g of natural cellulose fiber; 20 g of a coumarone-indene resin; 5 g of amide wax; and 2.5 g of polyphosphate.

Example 2

The procedures were performed in the same manner as described in Example 1, excepting that 20 g of ethylene-glycidyl methacrylate copolymer was further used.

Example 3

The procedures were performed in the same manner as described in Example 1, excepting that 15 g of 4,4-diphenylmethane diisocyanate was further used.

Example 4

The procedures were performed in the same manner as described in Example 1, excepting that 2 g of a saturated polyester resin was further used.

Example 5

The procedures were performed in the same manner as described in Example 1, excepting that 12 g of hydroxyl ethyl acryloyl phosphate was further used.

Example 6

The procedures were performed in the same manner as described in Example 1, excepting that 35 g of crosslinked polyacrylate salt was further used.

Example 7

The procedures were performed in the same manner as described in Example 1, excepting that 15 g of a liquid type polyphosphate-based antistripping agent having a specific gravity of 1.0 or greater and a viscosity (at 60° C.) of 110 cPs was further used.

Example 8

The procedures were performed in the same manner as described in Example 1, excepting that 3 g of polyethylene wax was further used.

Example 9

The procedures were performed in the same manner as described in Example 1, excepting that 100 g of waste asphalt was further used.

Example 10

The procedures were performed in the same manner as described in Example 1, excepting that 20 g of nitrile rubber was further used.

Example 11

The procedures were performed in the same manner as described in Example 1, excepting that 10 g of an oil-modified alkyd resin was further used.

Example 12

The procedures were performed in the same manner as described in Example 1, excepting that 0.5 g of sodium benzoate was further used.

Example 13

The procedures were performed in the same manner as described in Example 1, excepting that 1 g of dimer acid was further used.

Example 14

The procedures were performed in the same manner as described in Example 1, excepting that 5 g of tetraethylene pentamine was further used.

Example 15

The procedures were performed in the same manner as described in Example 1, excepting that 3 g of bentonite was further used.

Example 16

The procedures were performed in the same manner as described in Example 1, excepting that 2 g of calcium aluminate was further used.

Example 17

The procedures were performed in the same manner as described in Example 1, excepting that 3 g of fluorinated sodium was further used.

Example 18

The procedures were performed in the same manner as described in Example 1, excepting that 3 g of styrene-butadiene resin was further used.

Experiments

The individual compositions prepared according to the examples were used to prepare asphalt layers having a thickness of about 60 mm, and the asphalt layers were measured in regards to porosity, adhesiveness, dynamic stability, indirect tensile strength, deformation strength, and compression strength. The measurement results are presented in Table 1.

In this regard, the dynamic stability was measured through the deformation strength test according to the Kim Test to evaluate the resistance to plastic deformation; the indirect tensile strength was measured to evaluate the crack resistance; and the compression strength was measured using an asphalt compression strength tester.

TABLE 1

| Div. | Example 1 | Example 2 | Example 3 | Example 4 | Example 5 | Example 6 | Example 7 | Example 8 | Example 9 |
|---|---|---|---|---|---|---|---|---|---|
| Porosity | 0.4% | 0.7% | 0.3% | 0.7% | 0.6% | 0.5% | 0.3% | 0.4% | 0.7% |
| Adhesiveness | Good | Good | Good | Good | Good | Good | Good | Good | Good |
| Dynamic stability (pass/mm) | 1812 | 1833 | 1932 | 1904 | 1894 | 1894 | 1839 | 1833 | 1852 |
| Indirect tensile strength (ITS) | 0.87 | 0.89 | 0.81 | 0.91 | 0.88 | 0.86 | 0.83 | 0.89 | 0.88 |
| Deformation strength | 5.44 | 5.46 | 4.63 | 5.42 | 5.98 | 6.01 | 5.77 | 5.93 | 5.88 |
| Compression strength (MPa) 3 days | 21.2 | 23.2 | 28.7 | 27.2 | 28.1 | 29.3 | 28.2 | 29.1 | 23.2 |
| 7 days | 25.5 | 25.7 | 31.8 | 31.2 | 32.3 | 31.1 | 31.3 | 31.2 | 24.3 |
| 28 days | 77 | 78 | 77 | 79 | 78 | 81 | 84 | 79 | 77 |

| Div. | Example 10 | Example 11 | Example 12 | Example 13 | Example 14 | Example 15 | Example 16 | Example 17 | Example 18 |
|---|---|---|---|---|---|---|---|---|---|
| Porosity | 0.6% | 0.6% | 0.7% | 0.7% | 0.5% | 0.2% | 0.2% | 0.3% | 0.5% |
| Adhesiveness | Good | Good | Good | Good | Good | Good | Good | Good | Good |
| Dynamic stability (pass/mm) | 1844 | 1892 | 1840 | 1894 | 1849 | 1892 | 1844 | 1894 | 1849 |
| Indirect tensile strength (ITS) | 0.87 | 0.86 | 0.88 | 0.86 | 0.88 | 0.87 | 0.87 | 0.86 | 0.86 |

TABLE 1-continued

| | | | | | | | | | |
|---|---|---|---|---|---|---|---|---|---|
| Deformation strength | | 5.92 | 5.42 | 5.63 | 5.33 | 5.66 | 5.58 | 5.63 | 5.33 | 5.68 |
| Compression | 3 days | 22.4 | 29.2 | 28.1 | 23.2 | 21.4 | 28.2 | 28.1 | 24.2 | 21.4 |
| strength | 7 days | 25.1 | 32.3 | 31.3 | 26.1 | 27.1 | 32.3 | 31.3 | 25.1 | 28.1 |
| (MPa) | 28 days | 78 | 78 | 77 | 78 | 79 | 78 | 78 | 78 | 77 |

As shown in Table 1, the Examples 1 to 18 using the high-grade mastic asphalt composition displayed excellences in porosity, adhesiveness, dynamic stability, indirect tensile strength, and deformation strength. As the compression strength was 75 MPa or higher in 28 days, all the concrete compositions of the Examples proved to have high strength.

As explained above, it is to be apparent to those skilled in the art that the present invention may be readily implemented in various other ways without changing its technical conception or essential features. Therefore, the above-specified examples are all given to illustrate the present invention and not construed to limit the present invention. It is also to be noted that the scope of the present invention includes all the modifications and variations belonging to the principles of the present invention and deduced from the meanings and scope of the following claims and theft equivalent conceptions rather than the detailed description of the present invention.

What is claimed is:

1. A high-grade mastic asphalt composition comprising:
   100 parts by weight of a natural asphalt mix;
   5 to 40 parts by weight of styrene isoprene styrene;
   10 to 60 parts by weight of at least one polymer resin selected from the group consisting of vinyl ester resin, polyester resin, acryl resin, epoxy resin, acryl-epoxy resin, and urethane resin;
   10 to 1,000 parts by weight of an aggregate;
   1 to 20 parts by weight of a thermosensitive reinforcing agent;
   10 to 60 parts by weight of a filler;
   10 to 40 parts by weight of a nanoceramic particle;
   1 to 15 parts by weight of a surfactant;
   0.1 to 5 parts by weight of an antioxidant;
   0.5 to 5 parts by weight of a stabilizer;
   0.5 to 10 parts by weight of a performance enhancer;
   2 to 20 parts by weight of a fiber;
   10 to 50 parts by weight of a cohesive resin;
   2 to 10 parts by weight of an antisagging agent;
   1 to 5 parts by weight of a compatibilizer;
   5 to 30 parts by weight of a glycidyl methacrylate (GMA)-based resin with respect to 100 parts by weight of the natural asphalt mix;
   0.1 to 5 parts by weight of bentonite with respect to 100 parts by weight of the natural asphalt mix;
   1 to 5 parts by weight of calcium aluminate with respect to 100 parts by weight of the natural asphalt mix; and
   1 to 5 parts by weight of fluorinated sodium with respect to 100 parts by weight of the natural asphalt mix.

2. A paving construction method using a high-grade mastic asphalt composition comprising:
   (a) removing foreign substances from a target surface for paving and then cleaning the surface;
   (b) depositing a high-grade mastic asphalt composition on the target surface after the completion of the cleaning step, wherein the high-grade mastic asphalt composition comprises 100 parts by weight of a natural asphalt mix, 5 to 40 parts by weight of styrene isoprene styrene, 10 to 60 parts by weight of at least one polymer resin selected from the group consisting of vinyl ester resin, polyester resin, acryl resin, epoxy resin, acryl-epoxy resin, and urethane resin, 10 to 1,000 parts by weight of an aggregate, 1 to 20 parts by weight of a thermosensitive reinforcing agent, 10 to 60 parts by weight of a filler, 10 to 40 parts by weight of a nanoceramic particle, 1 to 15 parts by weight of a surfactant, 0.1 to 5 parts by weight of an antioxidant, 0.5 to 5 parts by weight of a stabilizer, 0.5 to 10 parts by weight of a performance enhancer, 2 to 20 parts by weight of a fiber, 10 to 50 parts by weight of a cohesive resin, 2 to 10 parts by weight of an antisagging agent, 1 to 5 parts by weight of a compatibilizer, 5 to 30 parts by weight of a glycidyl methacrylate (GMA)-based resin with respect to 100 parts by weight of the natural asphalt mix, 0.1 to 5 parts by weight of bentonite with respect to 100 parts by weight of the natural asphalt mix, 1 to 5 parts by weight of calcium aluminate with respect to 100 parts by weight of the natural asphalt mix, and 1 to 5 parts by weight of fluorinated sodium with respect to 100 parts by weight of the natural asphalt mix; and
   (c) curing the mastic asphalt composition after the completion of the depositing step (b).

* * * * *